US005894277A

United States Patent [19]

Keskin et al.

[11] Patent Number: 5,894,277

[45] Date of Patent: Apr. 13, 1999

[54] PROGRAMMABLE DIGITAL ELECTRONIC LOCK

[75] Inventors: Yucel K. Keskin, Cupertino; Asil T. Gokcebay, San Francisco, both of Calif.

[73] Assignee: Security People, Inc., San Francisco, Calif.

[21] Appl. No.: 08/615,397

[22] Filed: Mar. 12, 1996

[51] Int. Cl.$^{6}$ .............................. G06F 7/04; E05B 47/00; E05B 49/00; G06K 5/00

[52] U.S. Cl. ......................... 340/825.31; 70/277; 70/278; 235/382

[58] Field of Search ......................... 340/825.31; 70/277, 70/278, 286, 276, 3, 21; 235/382

[56] References Cited

U.S. PATENT DOCUMENTS

| | | | |
|---|---|---|---|
| 3,754,164 | 8/1973 | Zorzy . | |
| 3,754,213 | 8/1973 | Morroni et al. . | |
| 3,831,065 | 8/1974 | Martin et al. . | |
| 3,878,511 | 4/1975 | Wagner . | |
| 4,243,256 | 1/1981 | Frydrych | 70/277 |
| 4,495,540 | 1/1985 | Remington et al. . | |
| 4,568,998 | 2/1986 | Kristy | 361/172 |
| 4,887,445 | 12/1989 | Beatty . | |
| 4,931,789 | 6/1990 | Pinnow | 340/825.56 |
| 5,020,345 | 6/1991 | Gartner et al. . | |
| 5,021,776 | 6/1991 | Anderson et al. . | |
| 5,033,282 | 7/1991 | Gartner et al. . | |
| 5,153,561 | 10/1992 | Johnson . | |
| 5,321,963 | 6/1994 | Goldman | 70/278 |
| 5,373,718 | 12/1994 | Schwerdt et al. | 70/278 |

*Primary Examiner*—Michael Horabik
*Assistant Examiner*—Anthony A. Asongwed
*Attorney, Agent, or Firm*—Thomas M. Freiburger

[57] ABSTRACT

An electronic lock for use with lockers assigned for transitory or permanent use, has a keypad for entering a preselected sequence of digits. Programmable for each use in the transitory mode, the lock shifts a latch to locked position on a first entry of a sequence chosen by the user, and retracts the latch to unlocked position when the same sequence is reentered by the user. A subsequent user of the locker when unlocked can enter any sequence of digits desired. In the mode of a longer term assigned locker, the electronic lock is programmed by, for example, a student, and the same combination is retained as long as desired. In this mode, the selected sequence is used only to unlock, with the latch or mortise being spring-biased. The construction of the electronic lock is modular, easily fitting on nearly all contemporary locker designs, retained by only a few screws. An outer housing on the outside of the locker door has an electrical plug-in connection through the door with an inner housing at the inside of the door, and the housing portions can be changed to opposite hand use. Power input ports preferably are included on the front of the outer housing to power the lock in the event of battery failure, and in addition, an audible beep occurs when batteries are low. An LED indicator can be included for status, as can an infrared reader for instant reprogramming of a large bank of lockers such as in a school.

26 Claims, 15 Drawing Sheets

PROGRAMMABLE DIGITAL ELECTRONIC LOCK

BACKGROUND OF THE INVENTION

This invention is concerned with security of lockers, safes, or other such storage devices assigned for temporary or long-term use. In particular, the invention relates to an electronic keypad-activated lock for such storage situations.

Electronic digital locks are well known. For example, hotel safes for temporary use by guests have included digital locks with keypads for use by the guest. In some cases, the guest was able to select his own combination for the digital lock. In other cases, a combination sequence has been pre-assigned to electronic locks, with the combination sequence not under the control of the user.

The following U.S. Patents are believed to have some relevance to this invention: U.S. Pat. No. 5,153,561 (Johnson), U.S. Pat. No. 5,033,282 (Gartner), U.S. Pat. No. 5,021,776 (Anderson), U.S. Pat. No. 5,020,345 (Gartner), U.S. Pat. No. 4,887,445 (Beatty), U.S. Pat. No. 4,495,540 (Remington), U.S. Pat. No. 3,878,511 (Wagner), U.S. Pat. No. 3,831,065 (Martin), U.S. Pat. No. 3,754,213 (Merroni), and U.S. Pat. No. 3,753,164 (Zorzy).

There has been a need for a digital electronic lock of relatively inexpensive construction with more versatility as to use on various standard locker designs, modularity as to assembly and opposite-hand use, easy programmability as to selected combination sequence, and convenience and simplicity to the user. These are goals of the present invention described below.

SUMMARY OF THE INVENTION

In accordance with the present invention, a digital electronic lock is provided for convenient use in either transitory locker assignment situations or more permanent locker assignments, as well as for safes, such as in hotel rooms. In one preferred embodiment, the electronic lock has an inner housing secured at the inside of the locker door and an outer housing secured on the outside of the door. Through an opening in the door, a plug-in connector means provides electrical connection between the inner housing and the outer housing, through the door. In the outer housing is a keypad with a plurality of manually activated keys exposed at the outer side of the outer housing for entry of number sequences by a user. The inner housing has a solenoid connected to a latch or mortise, such that the position of the latch is controlled by the solenoid.

Within one of the housings (preferably the outer housing), connected between the keypad and the solenoid, is a microcontroller means for causing the solenoid to shift the position of the latch when keys of the keypad are pressed in a selected sequence. Also within one of the housings (which may be the inner housing) is a battery connected to supply power to the electronic lock, including the microcontroller means and the solenoid.

In a principal preferred embodiment, the digital electronic lock is incorporated in a temporarily assigned locker, such as in a locker room of a gym. For this mode, the electronic lock includes, in the inner housing, a magnetic latching solenoid. Such a solenoid includes a permanent magnet, an electromagnet and a spring, as is well known, so as to facilitate movement of the latch to either of two stable positions. Only a brief pulse of power is required to shift the position of the latch, e.g., a fraction of a second.

In this mode, the microcontroller in the electronic lock preferably is programmed to accept a certain number of any selected sequence of keys entered by a new user when the lock is unlatched. Thus, in a locker room of a fitness gym, a user chooses a locker, preferably by searching for a locker on which a front LED is unlit, indicating the locker is unused. When the user has put articles into the locker, he locks the locker by pressing a user-selected sequence of keys, causing the latch, via the magnetic latching solenoid, to be pulsed to the latched position. The "in-use" LED indicator then becomes illuminated, preferably with brief pulses, to show that the particular locker is in use. In a preferred embodiment, the microcontroller has been programmed to accept the same sequence of keys first entered by the user to cause retraction of the latch by the magnetic latching solenoid and unlocking of the locker. The latch stays in this position until another user enters a newly selected sequence of keys.

In another mode or model of the electronic lock device, a solenoid provides only for retraction and unlatching of the lock's latch. A spring constantly urges the latch toward the latched position, and the latch has a bevelled or cammed face to allow its retraction and latching when the door is closed. Entry of a selected key sequence by a user is effective only to retract the latch momentarily to allow opening of the door. In this form, the lock of the invention is effective for situations wherein a person is assigned to a locker on a permanent or long-term basis, such as in the case of student lockers, long-term assignment of club lockers, etc. In this form, the electronic lock has a reset mode in which a known simple code is programmed. Such a reset mode can be effected either by a certain master sequence of keys entered by a manager or supervisor, or, in one preferred embodiment, via infrared coupled input of signals to the lock device, which signals go to the microcontroller to reset the combination. When a new user is assigned a locker (such as a student at the commencement of a school year) the user selects a desired key sequence for the user's entire tenure of the locker. Entry of the reset code, followed by the desired sequence, programs the sequence as the new code or combination which will retract the latch. In many school situations, the school will want to retain control of the assignment of codes, and to have access to student lockers. They can elect to have the codes for all students selected randomly or by an algorithm, with the codes then associated with respective locker numbers in a school database. Infrared data transfer can be provided, and used to program each locker with the appropriate code in a fast and efficient procedure, whether codes are student-selected or computer-selected.

The inner housing, which as noted above is connected by a plug-in connector, with the outer, exposed housing through the locker door, is larger and preferably holds a battery for operation of the lock. In one embodiment, the battery comprises a pair of nine-volt batteries contained in this inner unit. These may be connected in parallel to power the microcontroller, keypad, solenoid, LED, and a beeper or tone generator for long life, which may be approximately two years. In normal use, most of the time the electronic lock in either embodiment is almost entirely quiescent, drawing very little power. In the case of the electronic lock in the temporarily assigned mode, e.g., for temporary lockers, an LED preferably is included which pulses briefly, less than one cycle per second. This draws very little power from the battery.

In preferred embodiments, the electronic lock of the invention is modular, fitting most existing styles of locker doors. The two-piece, two-housing construction, with the simple plug-in electrical connection between them, allows for efficient and rapid installation or retrofitting. The unit, including both housings, can be secured to a locker door using only two threaded fasteners. In addition, as noted above, the device can be used on either left-handed or right-handed doors, with the rear or inner housing merely flipped over 180° and plugged together with the outer housing in the same manner.

Preferably a master key sequence and a grand master key sequence are recognized by the microprocessor for overriding the sequence chosen by the immediate user. This allows opening of the locker door when a combination has been forgotten or other such situations. The overriding master key sequence preferably includes one or more additional digits in the keying sequence, with the grand master sequence including a still greater number of digits.

Another feature of the invention is an automatic time limitation on the use of the temporarily assigned locker. After a preselected time (which preferably may be programmed by the manager or owner) a locked locker will automatically unlock. This prevents one user from monopolizing a locker, using the locker overnight, etc.

In the event of battery failure, the unit activates a beep or tone signal when it is used, to signify low battery power as in a smoke detector. If the battery is completely dead or too weak to retract the latch, the electronic lock unit may be "jumped" via a pair of recesses on the front of the outer housing with terminals inside. Thus, a battery of the correct voltage can be used to supply power into the unit via conductors entering the two recesses, to permit opening the door using the selected sequence. Once the door is opened, access can be gained to the inner housing unit, for replacement of batteries.

The keypad preferably has twelve keys, including digits 0–9 and two additional keys in the position of the asterisk and pound keys on a telephone. These two additional keys may function as initializing open and close. In a preferred embodiment, the lower left key is first pushed to initiate a sequence and to "switch on" or "wake up" the system, including the microcontroller. The pulsing of this key, whose contacts are always active in the quiescent state, connects power to the microcontroller, activates the remaining keys for receipt of pulses, and also activates a short "beep" or similar audible tone which occurs on pressing of each key thereafter in the sequence. The user must enter a prescribed number of digits from the keys 0–9, followed by pressing of the lower right key or "enter" key; otherwise, the key sequence will be ineffective to activate the solenoid and this may be indicated by a longer beep tone, signifying error. When the "enter" key has been pushed, the lock is locked. The same procedure is repeated later to unlock. In one preferred embodiment, the lower left key bears a key symbol, while the lower right key bears a symbol of a lock.

In another embodiment the use of the start key is eliminated, with the system utilizing an efficient power regulator so that no "initializing" of the system from a quiescent state is needed. The user simply enters the prescribed number of digits, then the "lock" symbol (lower right) to lock; and the same digits followed by the "key" symbol (lower left) to unlock. Reset can be effected by pressing either of these two function keys.

It is accordingly among the objects of the invention to provide a very easily used, inexpensively produced modular programmable electronic lock for lockers and similar situations for storage of articles, wherein each user is allowed to select any desired combination. These and other objects, advantages and features fo the invention will be apparent from the following description of preferred embodiments, considered with the accompanying drawings.

DESCRIPTION OF PREFERRED EMBODIMENTS

Figure 1:
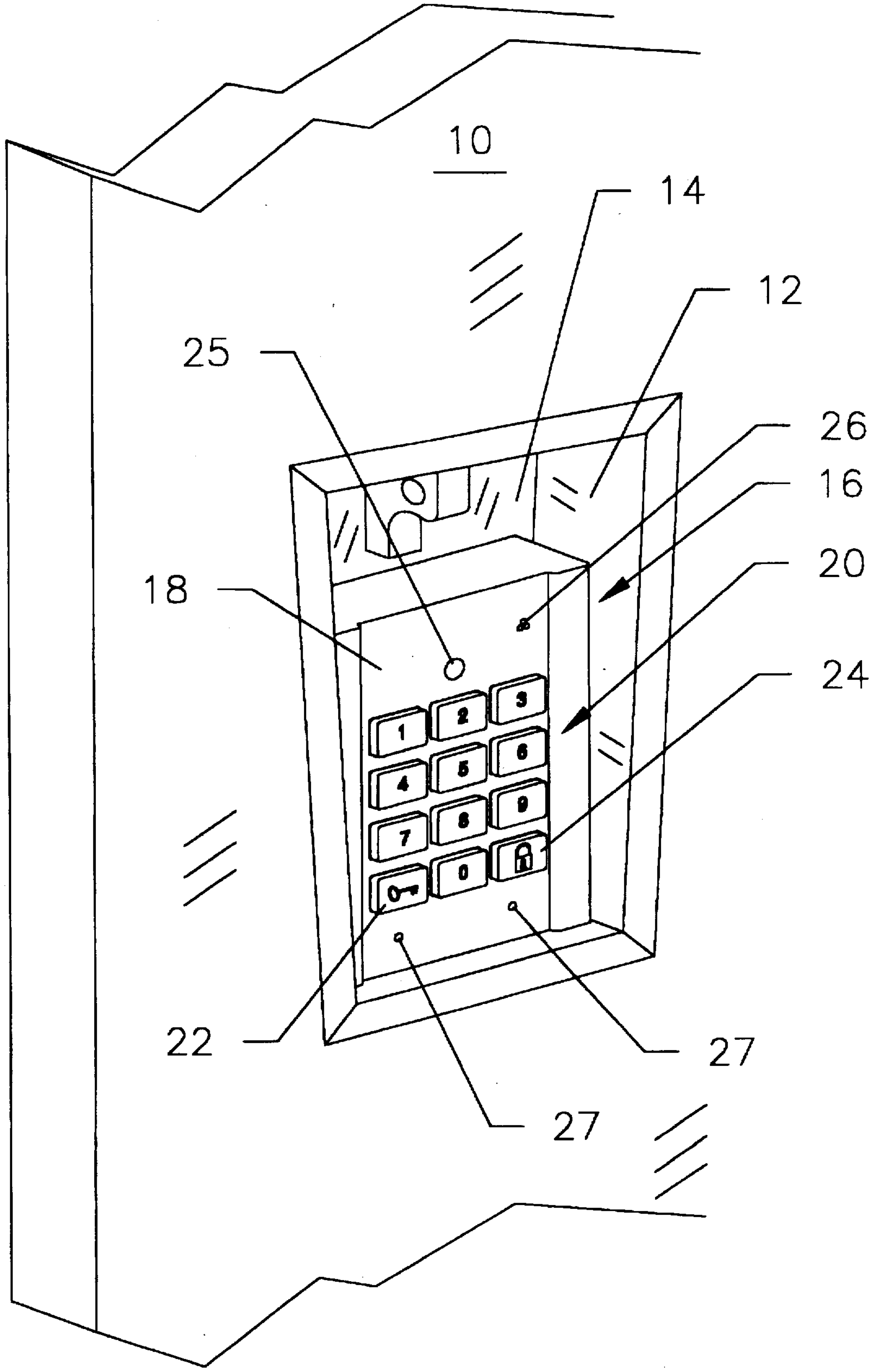
FIG. 1 is a frontal perspective view showing a front unit of an electronic lock in accordance with the present invention.

FIG. 1 shows a door 10 of a locker, of a typical configuration wherein a metal recess pan 12 is secured in an opening of the door, forming a recess space 14. An electronic lock 16 of the invention is shown secured on the locker door within this recess space. The electronic lock 16 includes an outer housing 18 which, as will be explained below, connects through the locker door (or through back of the recess pan 12) with an inner unit which may include and control the movement of a mortise, or which controls another lock or latch component.

As can be seen in FIG. 1, the front or outer housing 18 has a keypad 20 with a plurality of keys, including digit keys 0 through 9, preferably arranged in the usual pattern of a telephone keypad. In place of the asterisk and pound keys in a telephone keypad, the keypad 20 has a lower left key 22 which, in the preferred embodiment, acts as an initializing key, and a lower right key 24 which acts somewhat as an entry key. The housing 18 in one preferred embodiment is of metal, for ruggedness and durability as well as resistance to vandalism and theft.

Also indicated in FIG. 1 is an LED indicator 25 which may be located above the keys of the keypad as shown, and a small speaker or sound emitter indicated as small holes 26 in the housing or casing. Through these holes 26 a "beep" or other audible signal is emitted to indicate correct and incorrect entries, as explained further below. FIG.1

Figure 2:
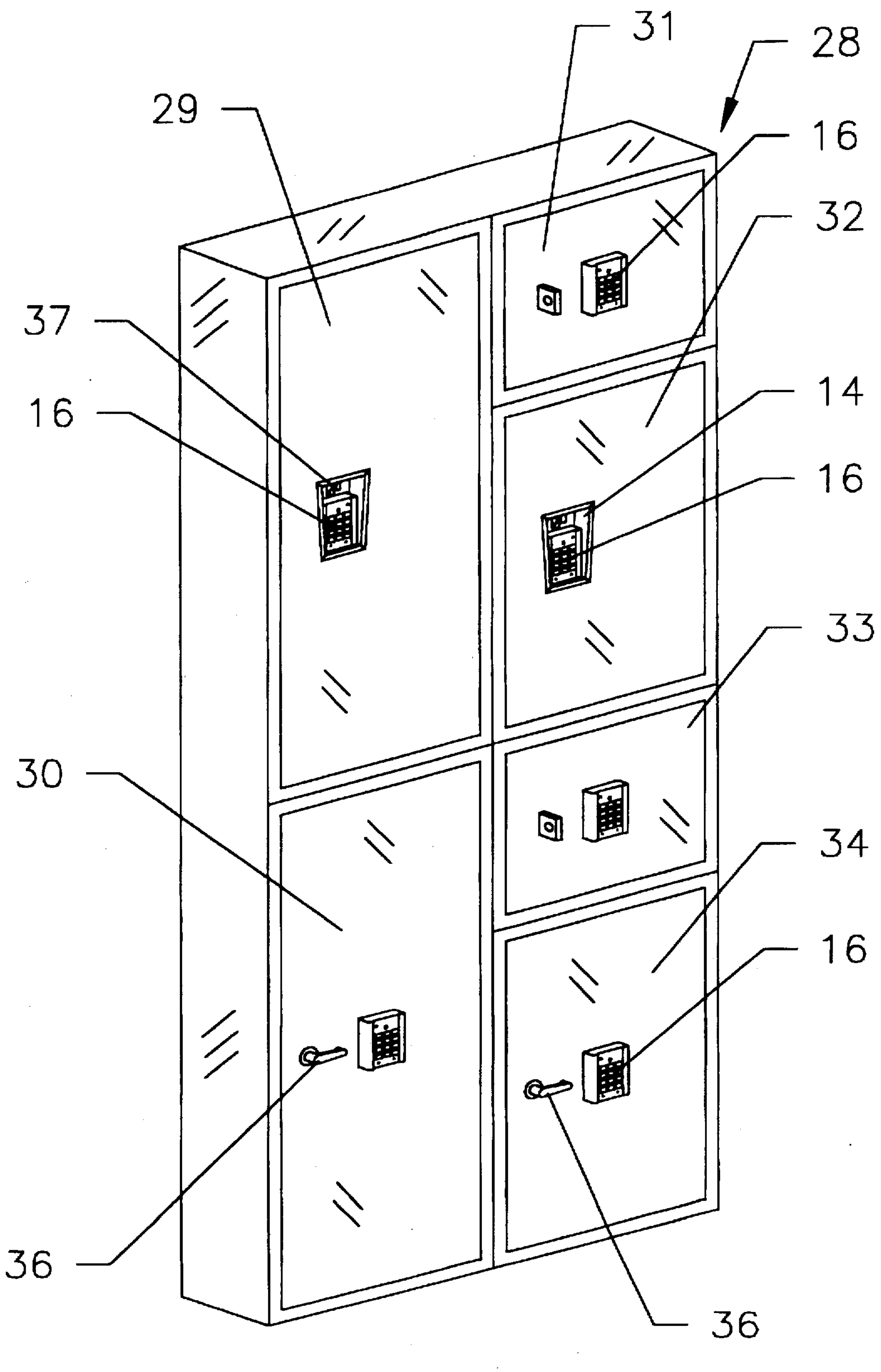
FIG. 2 is a perspective view showing a bank of lockers, each having an electronic lock of the invention.

FIG. 2 shows a bank of lockers 28 of various size, typical of lockers assigned for temporary use (e.g. one to four hours) in a fitness gym. These lockers are shown with electronic digital locks 16 of the invention, some within recesses 14 as shown, and some simply flat-mounted on the surfaces of locker doors 30, 31, 33, and 34. Locker doors 30 and 34 are shown as including a handle 36 which facilitates the actual manual opening of the locker door. In this case, the digital electronic lock 16 of the invention may act to release the handle via an internal latch when unlocked, so that the user can manually open the door using the handle 36. Locker doors 29 and 32 have the lock 16 mounted with the outer housing within the recess 14, and the inner housing (not shown in FIG. 2) has an internal locking mechanism which engages with fixed locker structure. When in locked mode the electronic lock 16 of the invention blocks the internal locking mechanism from moving vertically to unlock the locker. Locker doors 31 and 33 operate in a somewhat different manner. The bolt or latch (not shown) of the lock 16 acts as the blocking element against the door being pulled by extending outwardly in the locked position.

Figure 3:
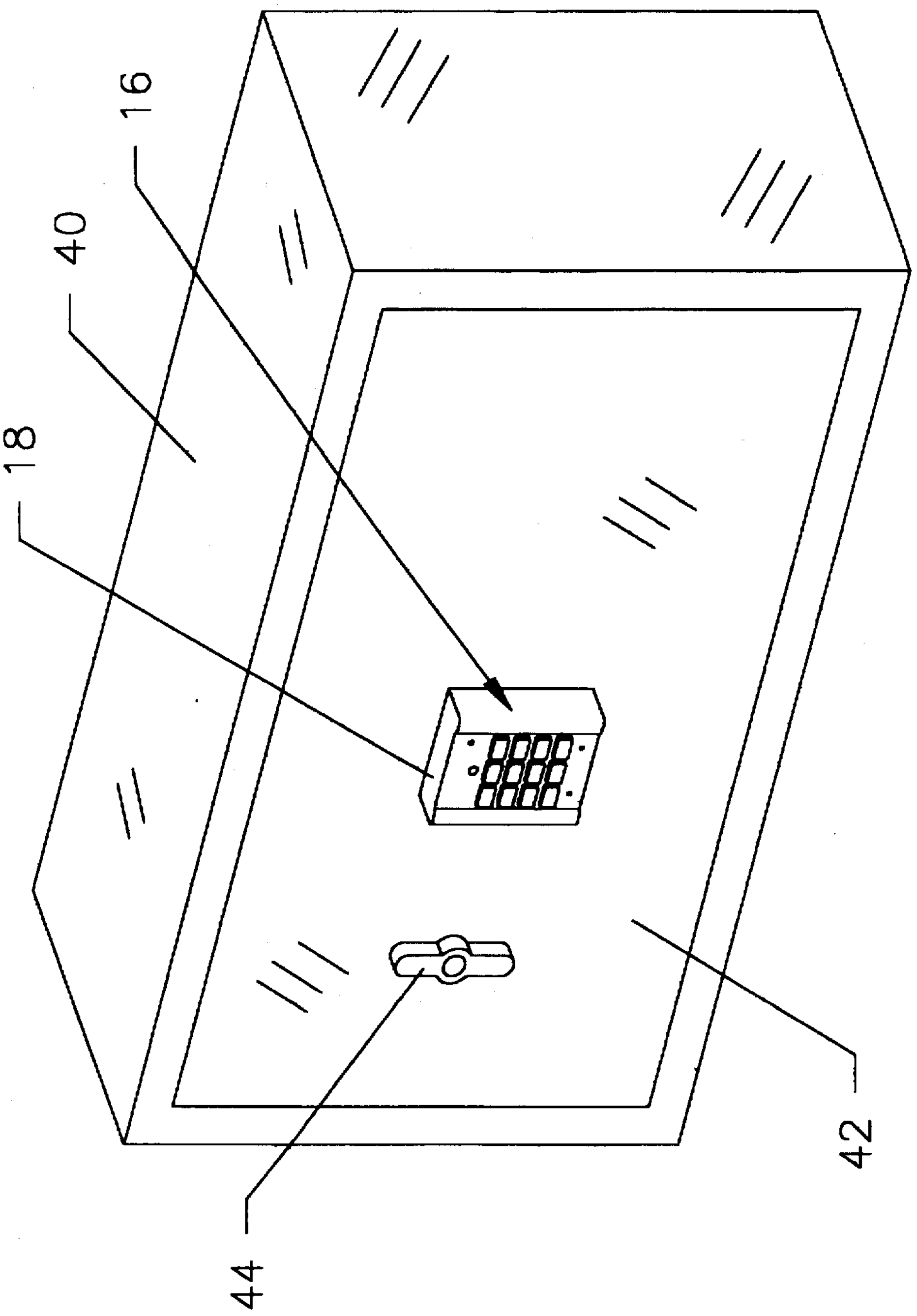
FIG. 3 is a perspective view indication a safe which incorporates the electronic look of the invention.

FIG. 3 shows, somewhat schematically, a safe 40, of the type which might be built into a hotel room wall, for example. The safe 40 is shown as including a digital electronic lock 16 of the invention, with the outer housing 18 mounted on the surface of the safe door 42. In this case, the safe is shown with a handle 44 for manually opening the door, and this handle is inhibited internally by a lock or latch which is under the control of the electronic lock 16. A latch engages handle movement to prevent rotation.

Figure 4:
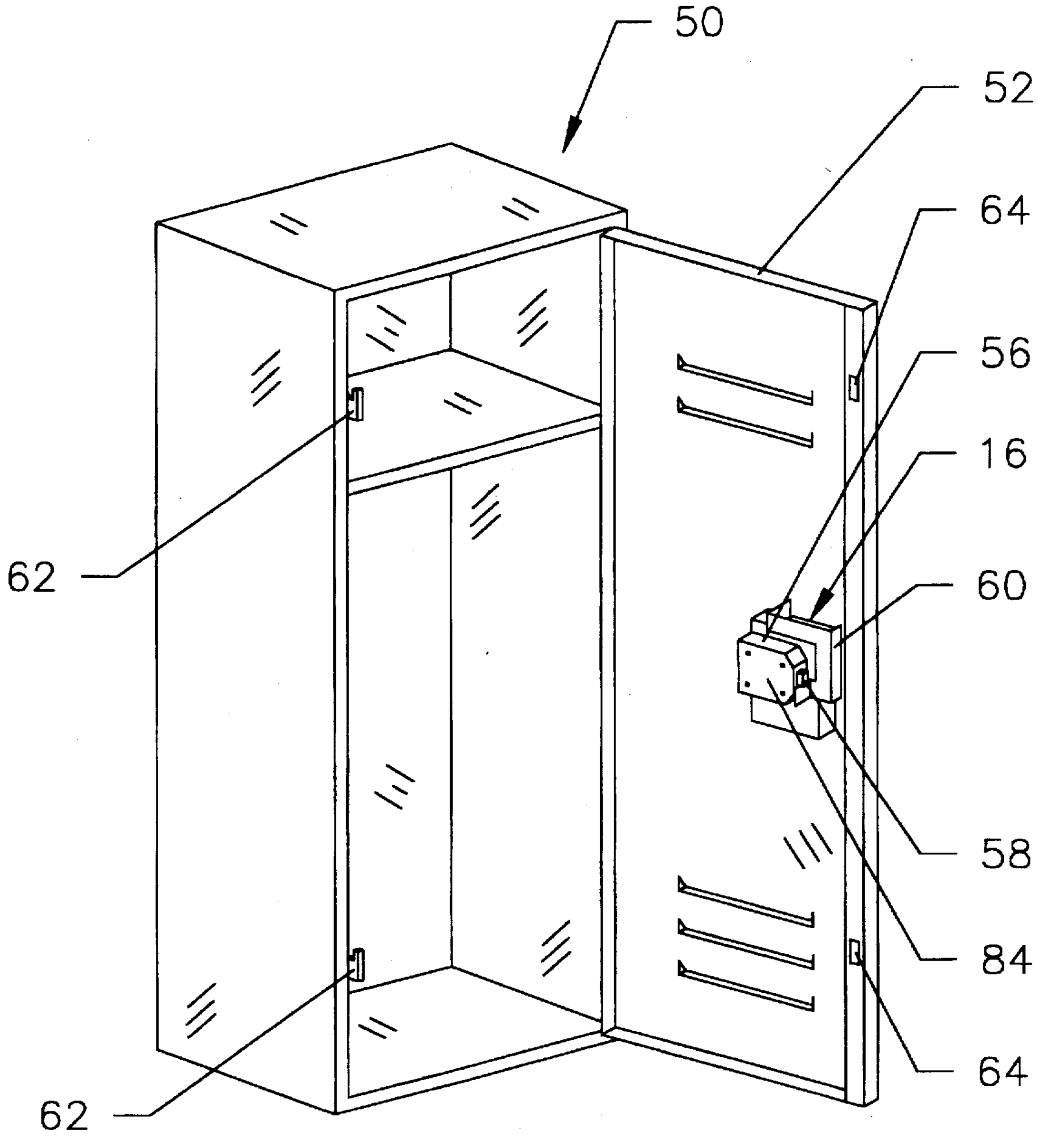
FIG. 4 is a perspective view showing a lockers with its door opened, showing an inner unit or housing of the electronic lock.

FIG. 4 shows a locker 50 with its door 52 open, and including a digital electronic lock assembly 16 of the invention. FIG. 4 reveals the back side of the locker door 52, showing an inner housing or back housing or unit 56. The inner housing unit 56 has a latch 58 which, in this preferred embodiment, engages a slidable member 60 which, when locked into position by the latch, prevents turning or lifting of a handle to open the locker. The locker 50 may be similar to the locker 29 shown in FIG. 2, with a recessed 37 (not shown in FIG. 4) which must be lifted by the user to open the relatively large locker door 52. Locker door catches are shown on the locker at 62, with openings 64 in the locker door edge also indicated, for engaging and latching the locker closed whenever the door is pushed to the closed position.

The electronic lock of the invention has been illustrated and described in the context of lockers, such as used in fitness gyms, schools, etc. However, it should be understood that the term "locker," as used in the claims, is intended to include not only lockers of the types described and illustrated but also safes (as in FIG. 3), lock boxes, storage vaults or containers, and other applicable uses wherein access is to be granted to a door or other latchable facility only when a combination is known. Thus, the term "locker" should be understood in a broader sense than the typical usage.

Figure 5:
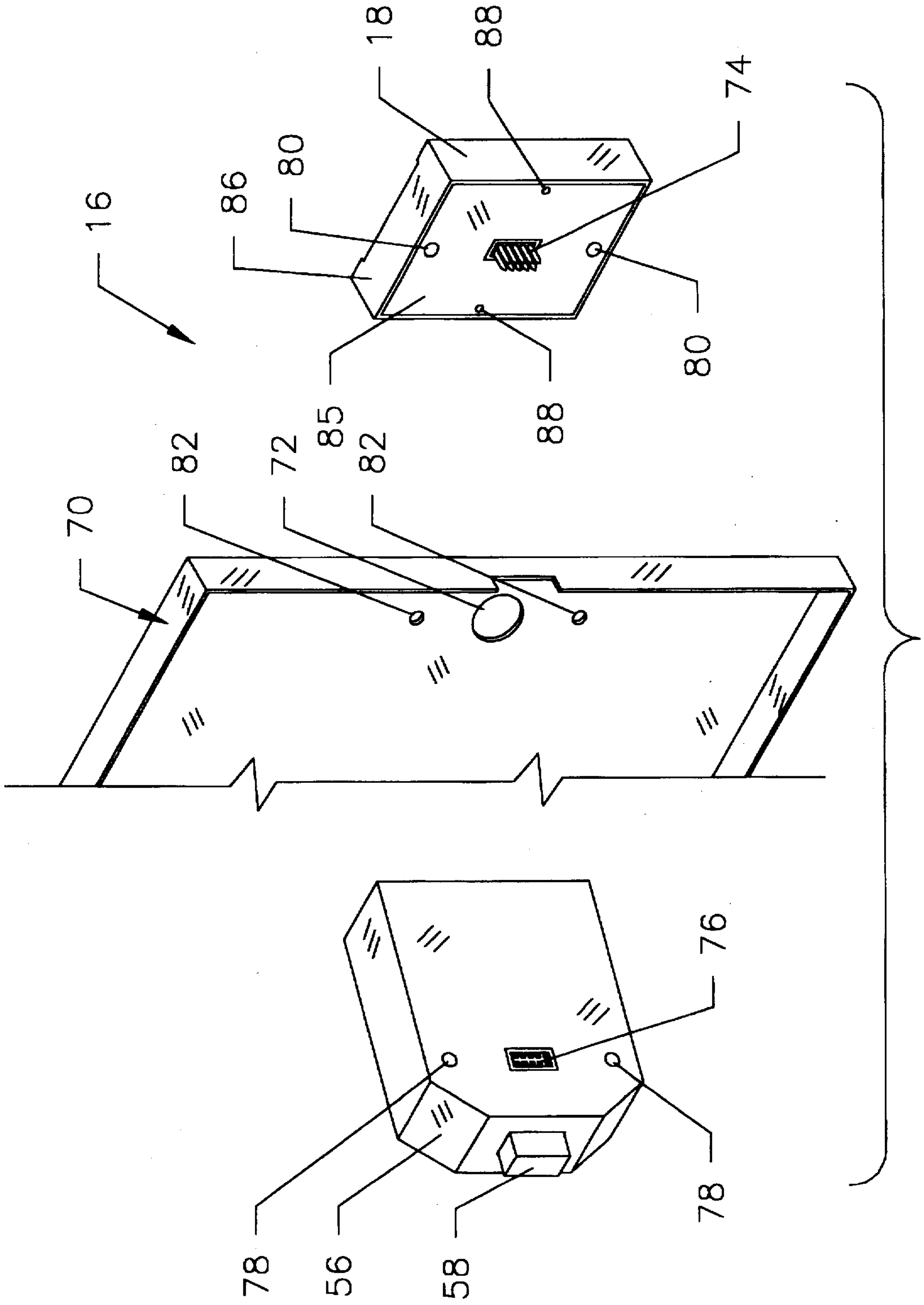
FIG. 5 is an exploded view in perspective, indicating assembly of the two sub-units or housings of the electronic lock, through a locker door.
Figure 6:
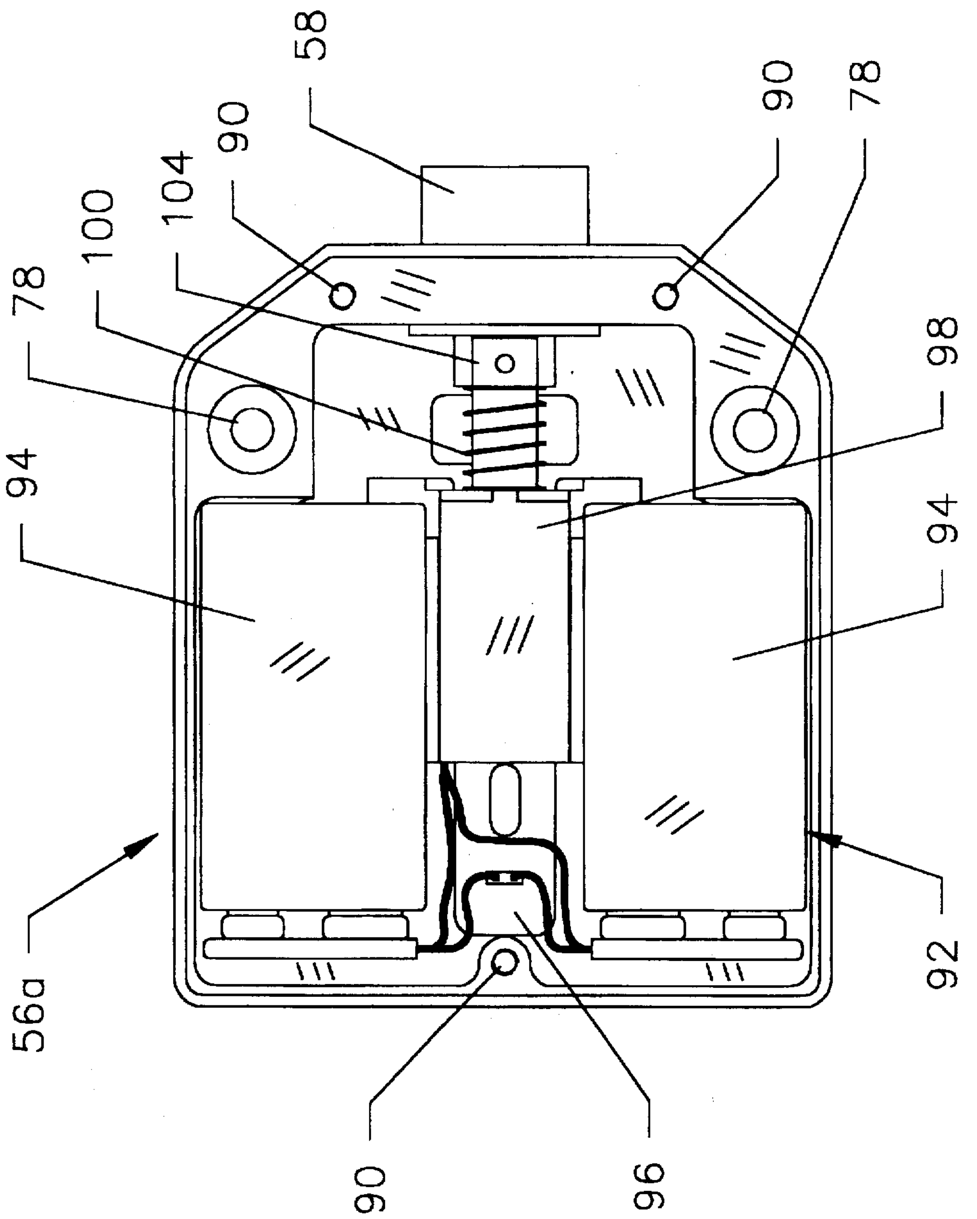
FIG. 6 is an elevation view of the inner housing of the lock, with a cover plate removed.

FIGS. 5 and 6 show further details of electronic lock assemblies 16 of the invention. FIG. 5 shows in exploded view an embodiment of the digital electronic lock 16 of the invention, with the outer housing 18 indicated as in position to be assembled through a locker door 70 to the rear or inner housing 56. As shown schematically in FIG. 5, a hole 72 is provided in the locker door, for receiving a plug-in electrical connection between the outer and inner housings 18 and 56 via opposed sets of electrical contacts fixed to the respective housings. The outer housing 18 has a series of connector pins 74 which may be six in number, and, when the housing 18 is correctly positioned on the locker door, these pins are aligned to pass generally centrally through the locker door hole 72, to be received in a pin connector receptacle or socket 76 of the inner housing 56. The pin connectors 74 and 76 are so wired within the housings 18 and 56 as to allow opposite-hand connection as discussed above; that is, the inner housing 56 can be flipped over 180° to receive the pins 74 in the opposite configuration as well, with no change in the resulting electrical connection. This modular feature and construction enhance the versatility of the lock device.

As indicated in the drawing, the inner housing 56 has bores at 78, and these are spaced similarly to bores 80 on the back side of the front or outer housing 18. The relationship of the bores 78, 80 to the plug-in pin connector apparatus is the same on both housings, so that, when the two housings are brought together with the locker door between, and the pin connectors are plugged together, the bores 78 and 80 are directly aligned. In a preferred embodiment the bores 80 are tapped holes, with threads for receiving machine screws which pass through the inner housing bores 78 and a pair of similarly aligned holes 82 in the locker door. Thus, as shown in FIG. 6 indicating a preferred embodiment **56*a* of the inner housing, with a back side cover removed (see back cover 84 in FIG. 4), machine screws (not shown) may be inserted through the holes 78 from the inside of the inner housing 56*a*. These threaded fasteners pass also through the locker door, i.e., the holes 82, and are threaded into the threaded bores 80 of the back side of the front (outer) housing 18**. With these two fasteners tightened down, the whole assembly is held together to the locker door with only two fasteners.

FIG. 5 also shows that the back plate 85 of the outer housing 18 may be held to a body component 86 of the housing by a pair of small machine screws 88. The back plate 84 (FIG. 4) of the inner housing 56 or **56*a* may be held in place by three small machine screws, threaded receiving holes for which are shown at 90** in FIG. 6.

As shown in FIG. 6, the inner housing 56 or **56*a* preferably is larger than the outer housing and includes space for receiving a battery generally indicated as 92. The term "battery" is used in its technical sense of meaning one or more cells which together make up the battery to power a device, and in this case the battery 92 may include two nine-volt cells or batteries 94 as shown. These nine-volt batteries provide ample power for driving the electronic lock up to several years, preferably with the two batteries 94 connected in parallel. As an example, each of the batteries 94 may have one terminal connected to a circuit board 96 as indicated, and another terminal connected to a solenoid at 98. The circuit board 96 is a controller for the solenoid 98**.

As discussed previously, in one preferred embodiment, exemplified by the inner housing **56*a* in FIG. 6, the system uses a magnetic latching solenoid, which is stable in both the latched (as shown) and unlatched or retracted positions. A light compression spring is shown at 100 for urging the latch or mortise 58 toward the latched position. As is well known, a permanent magnet (not shown) within the solenoid assembly 98 is positioned to hold the latch, against the force of the compressed spring 100**, when the latch is fully retracted.

However, if the solenoid is energized in one polarity, to push the solenoid plunger rod 104 toward the latched position, the spring 100 and the powered solenoid together have sufficient force to overcome the permanent magnet. Once the solenoid reaches the extended, latched position, it is beyond the force of the permanent magnet and remains there. When the electronic lock device is to be unlatched, the circuit board 96 sends a pulse (a fraction of a second) of opposite polarity to the solenoid which is sufficient to retract the plunger 104 and latch 58 against the spring 100 to the point of engagement with the permanent magnet.

As explained previously, if the electronic lock of the invention is on a locker or other storage facility designed for longer term ("permanent") use, no permanent magnet is included. The solenoid acts only in one direction, to retract the latch against the force of the spring 100 for a momentary, timed pulse which may be about two or three seconds. In that case, the latch or mortise will have a beveled camming surface so as to retract against the spring when necessary for the locker door to close.

As discussed above, a microcontroller chip is included in the electronic locks of the invention. The microcontroller and associated circuitry may be in either of the housings 56 or 18; in a preferred embodiment, this circuitry is included in the outer housing 18. Thus, the outer housing 18 may include, not shown in the drawings, a circuit board wired to all of the twelve keys (see FIG. 1), with the microcontroller chip on the circuit board. As an example, the programmable microcontroller may be a Motorola 6BHC705J1A.

Figure 7:
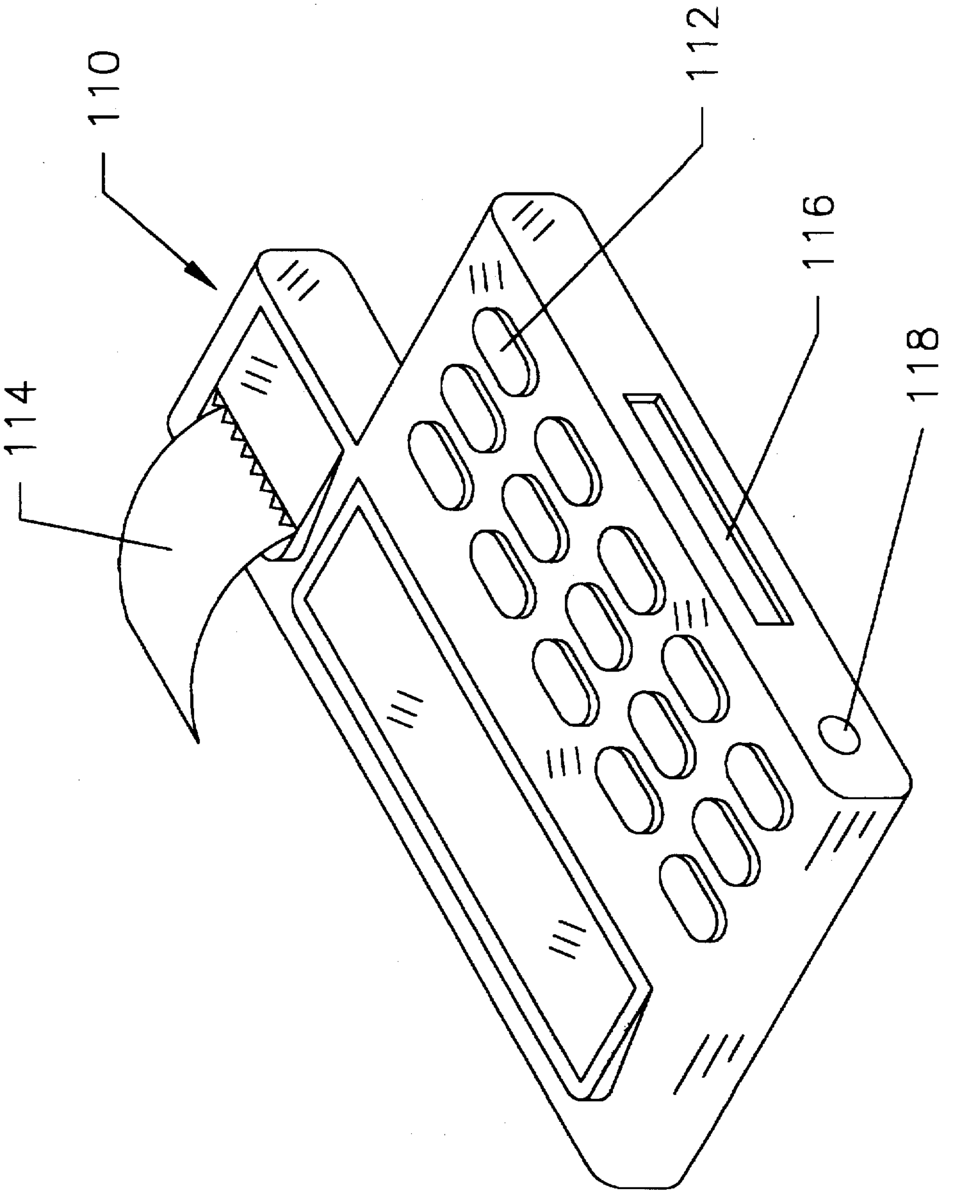
FIG. 7 is a schematic perspective view showing a computer console for storing locker codes in association with locker numbers.

FIG. 7 indicates a computer console unit 110, which may be included in an administration office of a school, for recording and controlling locker assignments. As the students sign up for the school year, they will be asked what code or combination they would like for their locker. The code or PIN number, along with the locker number, will be entered into the database of this console unit 110, via a keyboard 112. This procedure assures that the school officials have all codes recorded, in case of emergency, etc.

The console unit 110 has an attached printer 114 which can be used for giving the student a receipt of the transaction if desired, showing the student's name, the locker number, and the PIN number code. The console unit also has a means for storing the data permanently and for saving the data on a floppy disc (via floppy disc drive port 116).

Figure 8:
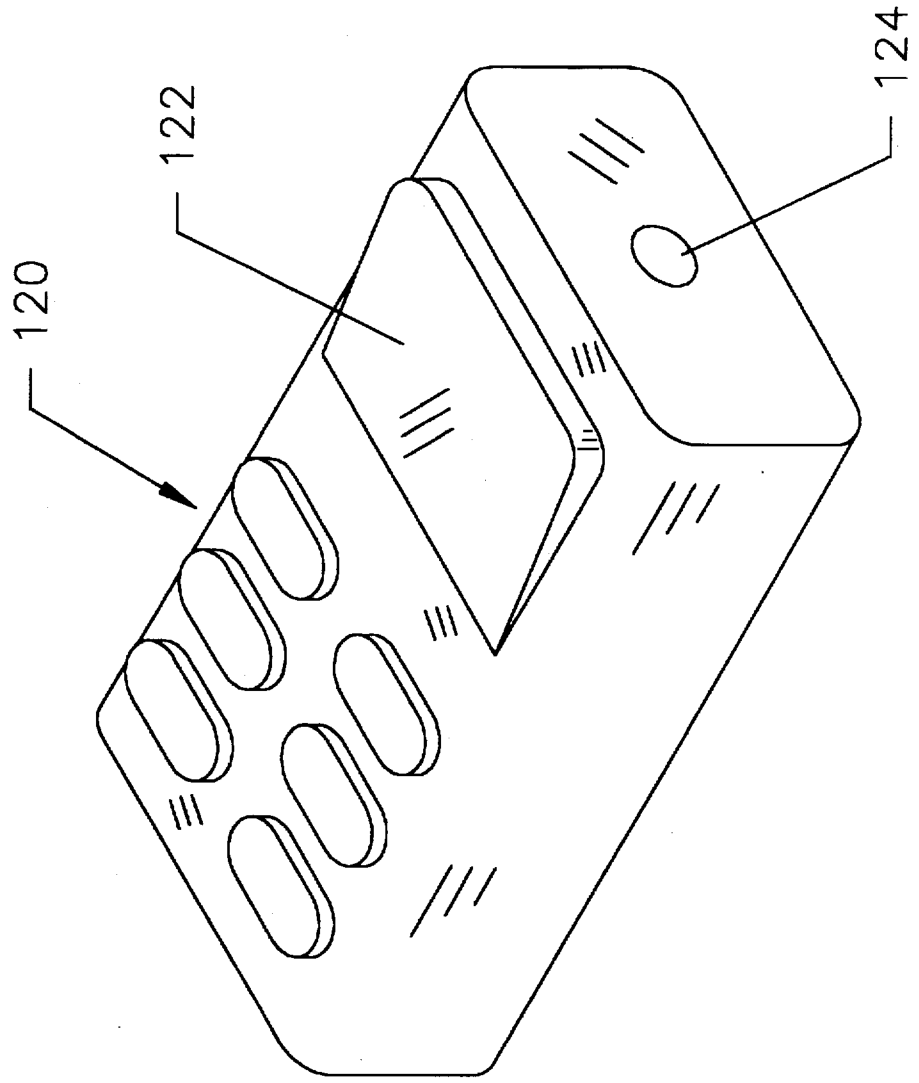
FIG. 8 is a schematic perspective view showing a remote programming unit for use with the computer console of FIG. 7, to program lockers with codes.

The console unit 110 also has a port 118 for connecting to a remote programming unit 120 shown in FIG. 8. Data from the console unit 110 is uploaded to the remote programming unit 120 after codes have been selected, for programming the locker locks.

The operator of the programming unit 120 positions the unit 120 in front of each locker lock to be programmed, and presses a program button 122. This causes data appropriate to that particular locker to be emitted via an infrared data stream, out an optical port 124, and into an optical port 126 of the locker lock **20*a* shown in FIG. 9. The programming unit 120 and the lock 20*a* exchange information, with the lock identifying itself to the unit 120, and the lock 20*a*** receives its new user code and master code.

It can be seen that the system as described above saves considerable paperwork and record keeping in schools having locker assignments wherein locker combinations are assigned to students. In prior systems, only four predetermined combinations have normally been available, to be used in an advancing sequence. This forces the school to manually record each locker and the last combination issued, so that the correct combination can be issued to a new student. Typically, at the beginning of a school year, a janitor would go to each locker with a set up key, and advance the combination of each locker to the next in a sequence.

Figure 9:
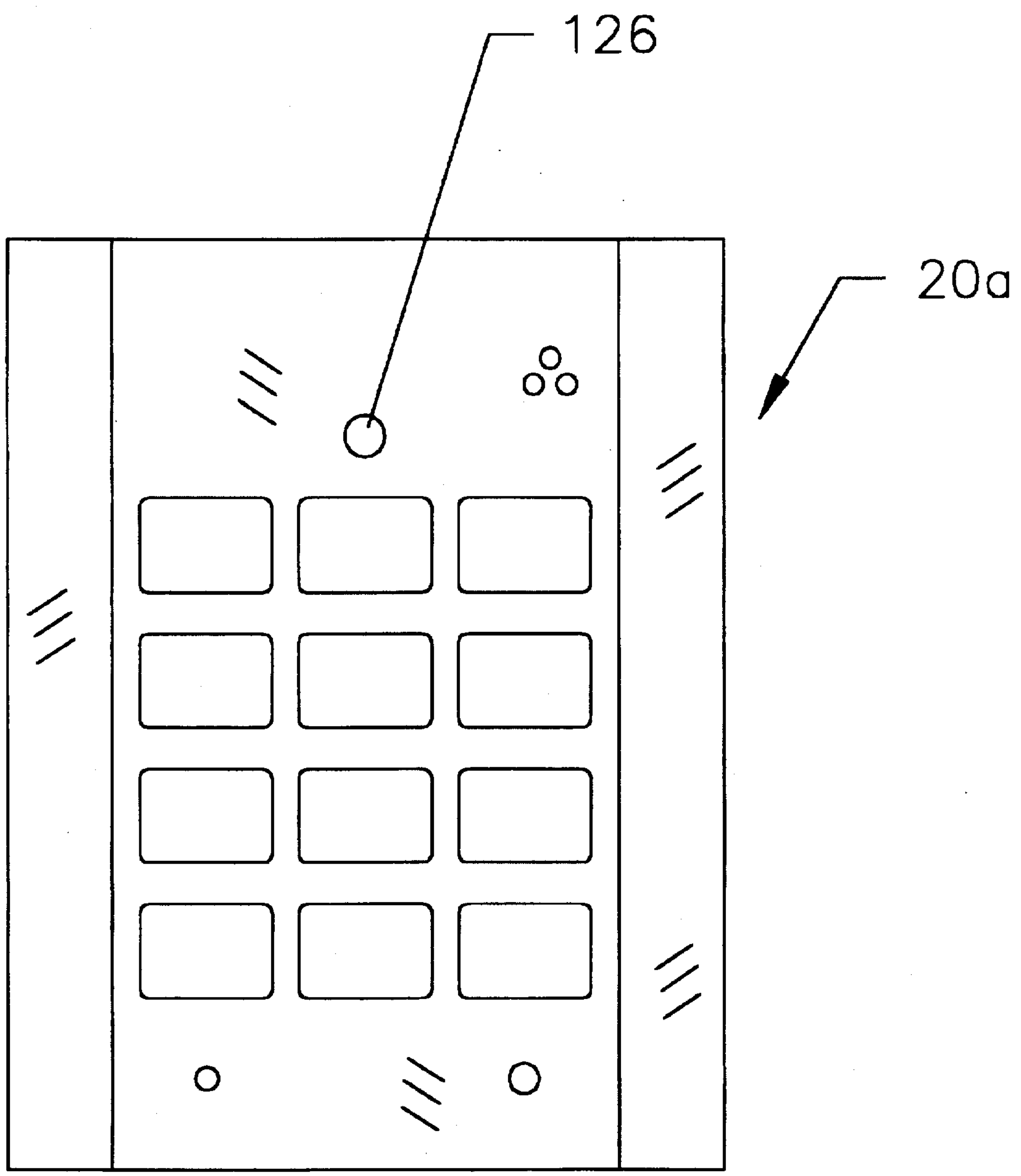
FIG. 9 is a schematic elevation view of a digital lock with an optical port for receiving programming.
Figure 10:
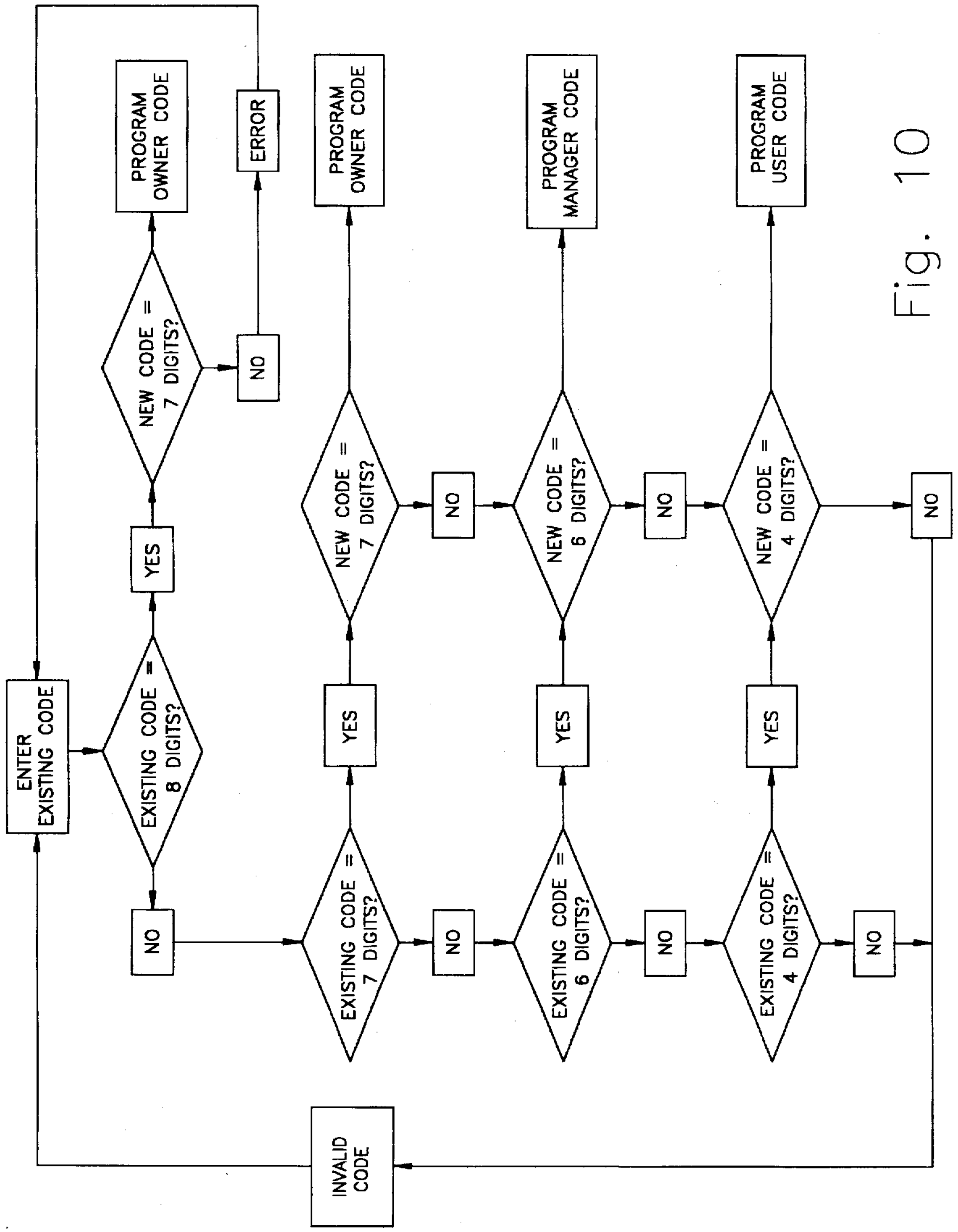
FIG. 10 is a simplified flow chart indicating programming procedure for locks in temporary assignment mode according to the invention.
Figure 11:
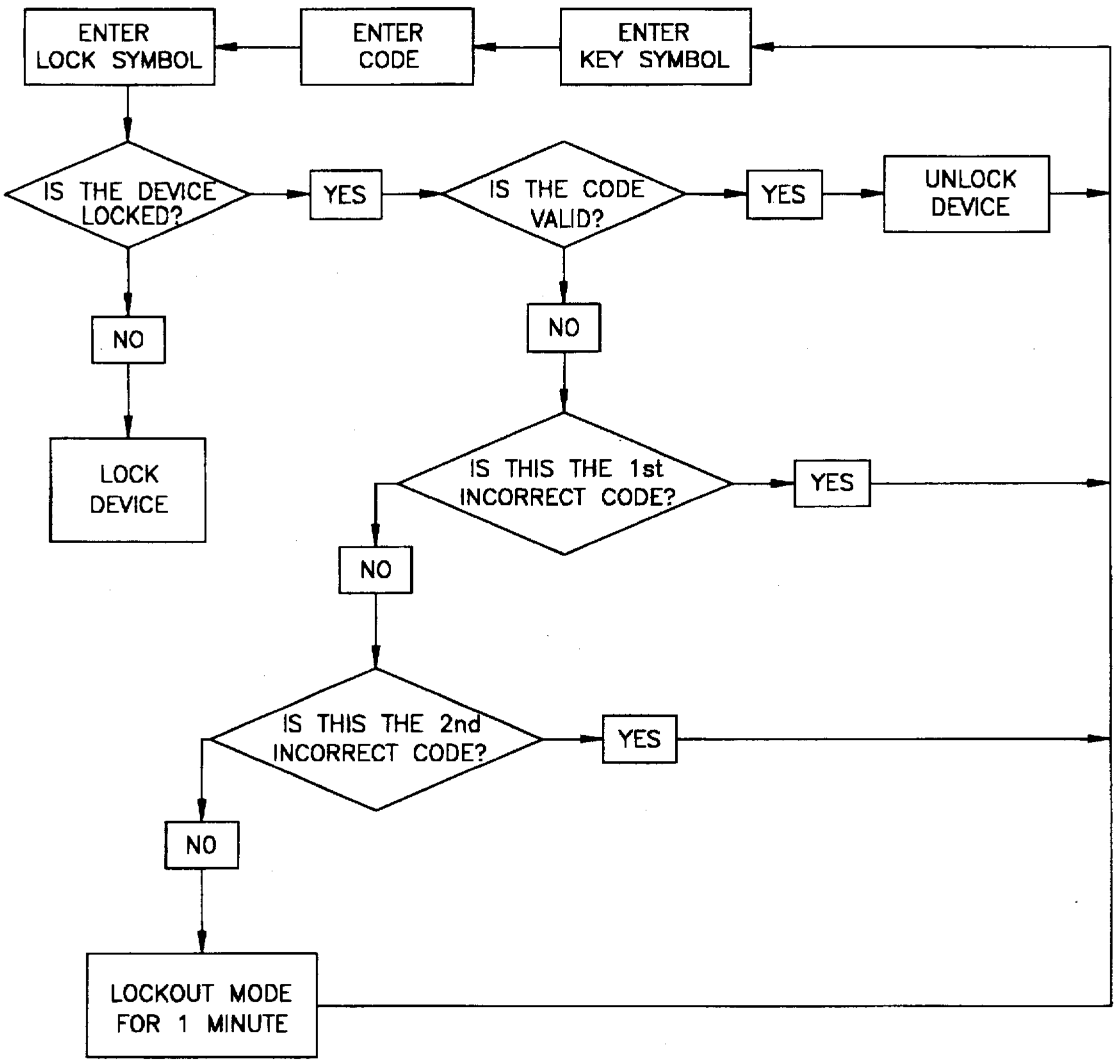
FIG. 11 is a simplified flow chart indicating usage in accordance with the temporary assignment mode.
Figure 12:
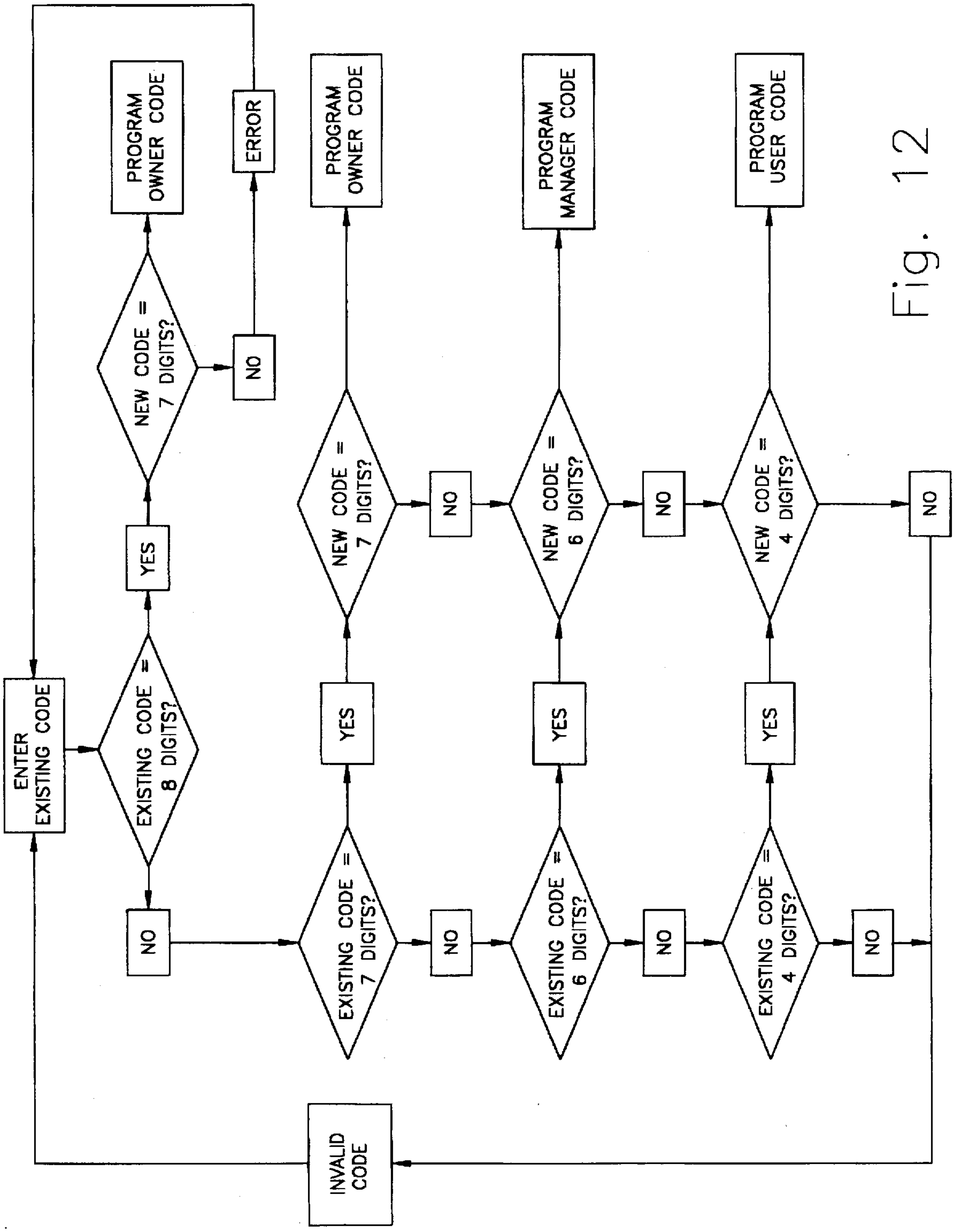
FIG. 12 is a simplified flow chart indicating programming of a lock in accordance with permanent assignment mode in accordance with the invention.
Figure 13:
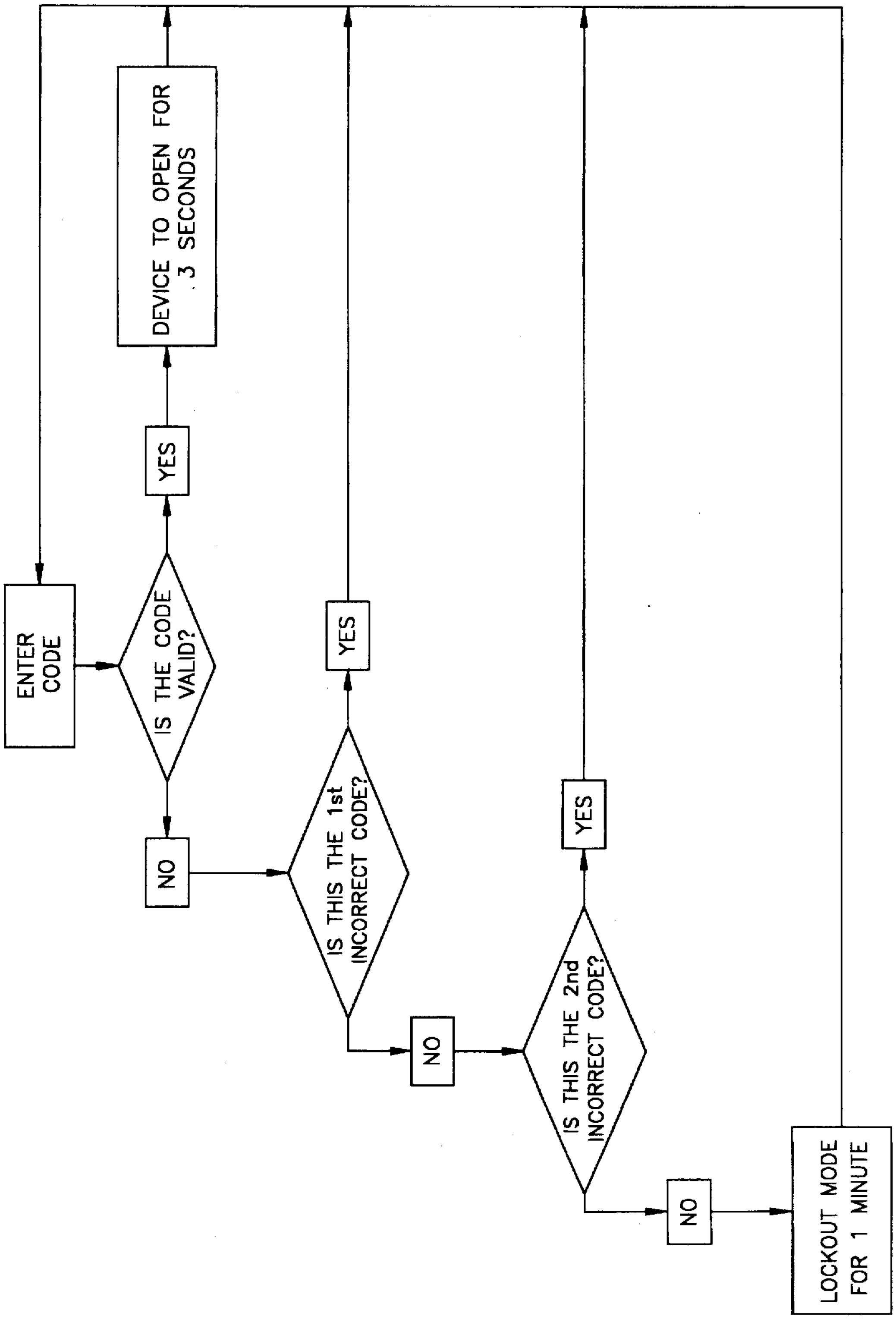
FIG. 13 is a simplified flow chart showing usage of a lock in permanent assignment mode.
Figure 14:
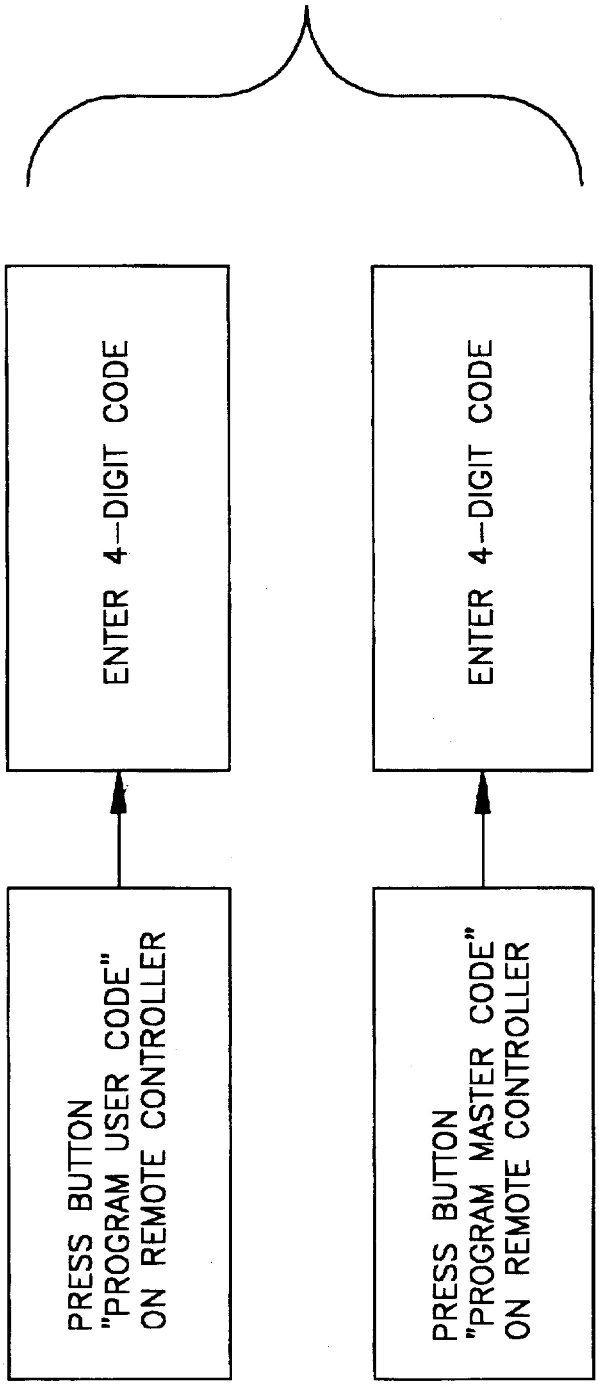
FIG. 14 is a simplified flow chart indicating programming of a lock of the invention for service such as a school locker assignment.
Figure 15:
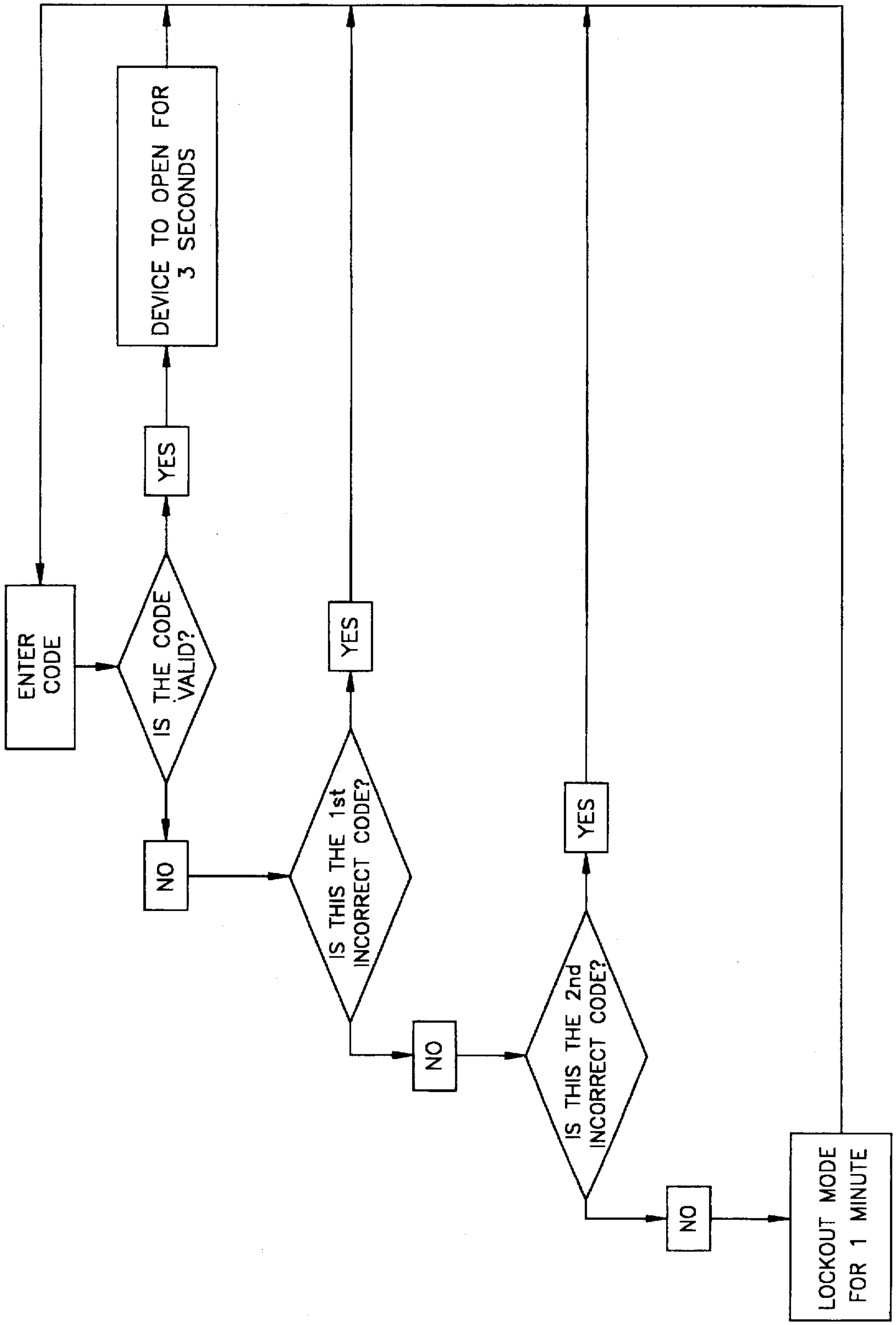
FIG. 15 is a simplified flow chart indicating usage of a lock in the school locker assignment mode.

As discussed earlier, many schools will desire to retain control over the assignment of locker combinations. In this case the systems as shown in FIGS. 7–9 and as discussed above can be set up to generate locker lock codes randomly or by secure algorithm (via the console 110's computer), and each thus generated code will be associated with a locker number in a database of the unit 110. This will prevent several students from choosing the same code, etc.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In combination with a locker for temporary storage of a user's articles, the locker having a door and a movable latch positioned to secure the door when in latched position and to unlock the door when moved to an unlatched position, an electronic lock for controlling the latch, comprising:

an inner housing and an outer housing, the inner housing being secured at the inside of the door and the outer housing being secured at a directly opposed position on the outside of the door such that the door is sandwiched between the two housings, with cordless plug-in connector means affixed to the housings for electrically and modularly connecting the inner housing directly to the outer housing, through an opening in the door, the plug-in connector means including opposed sets of electrical contacts, one set fixed to each housing and oriented toward the other set so as to connect together through the opening when the housings are secured to the door, a keypad in the outer housing, with a plurality of manually activated keys exposed at the outside of the outer housing for use by a user, a solenoid in the inner housing, connected to the latch so as to control the position of the latch, microcontroller means connected between the keypad and the solenoid, for causing the solenoid to change the position of the latch when keys of the keypad are pressed in a selected sequence, and a battery in one of the housings, connected to supply power to the electronic lock.

2. The apparatus of claim 1, wherein the microcontroller means includes locking and unlocking means for first causing the solenoid to change the position of the latch to the latched position when a user presses keys in a selected sequence, then, when the user presses keys in another sequence, causing the solenoid to retract the latch to the unlatched position.

3. The apparatus of claim 2, wherein said another sequence is the same sequence as said selected sequence.

4. The apparatus of claim 2, wherein the locking and unlocking means includes user-programmable means for permitting the user to choose any of a large number of sequences as said selected sequence, and wherein said another sequence includes at least a part of said selected sequence.

5. The apparatus of claim 4, wherein the keypad includes 12 keys, including the digits 0 through 9 and a further initializing key and an entry key, and the selected sequence including the initializing key as a first key in the sequence and the entry key as a last key in the sequence.

6. The apparatus of claim 4, further including LED indicator means on the outer housing, and the microcontroller means including means for illuminating the LED indicator means when the latch is in the latched position, thereby indicating the locker is already in use.

7. The apparatus of claim 4, wherein the microcontroller means includes lockout means for preventing keyboard entries from being effective to move the latch to unlatched position for a predetermined time duration, in the event a preselected number of consecutive keypad entry sequences are ineffective to move the latch.

8. The apparatus of claim 4, wherein the microcontroller means includes master key sequence means for causing retraction of the latch to the unlatched position upon pressing of keys in a prescribed master sequence including a greater number of keys pressed than in said selected sequence, whereby a user's selected sequence can be overridden by a person in possession of said prescribed master sequence.

9. A plurality of lockers as in claim 8, in close proximity, each having said electronic locks.

10. The apparatus of claim 8, wherein the microcontroller means further includes grand master key sequence means for causing retraction of the latch to the unlatched position upon pressing of keys in a prescribed grand master sequence, including a greater number of keys pressed than in said prescribed master sequence.

11. The apparatus of claim 4, wherein the microcontroller means includes time limit means for automatically causing movement of the latch from latched position to unlatched position upon passing of a predetermined time duration after the latch has moved to the latched position.

12. The apparatus of claim 4, wherein the microcontroller means includes programmable time limit means for allowing a time duration to be programmed through a prescribed sequence of key entries on the keypad, said time duration being effective when the locker is in use and latched to automatically cause retraction of the latch from latched position to unlatched position upon passing of said time duration after the latch has moved to the latched position.

13. The apparatus of claim 1, wherein the plug-in connector means includes reversible means for assembling the inner and outer housings in two 180°-opposed relative configurations for accommodating left-handed and right-handed locker doors while still making identical electrical connection between the inner and outer housings.

14. The apparatus of claim 1, wherein the microcontroller means further includes automatic means for moving the latch to the unlatched position when a preselected duration of time has elapsed following movement of the latch to the latched position.

15. The apparatus of claim 1, further including means for securing the inner and outer housings to the door of the locker using no more than two threaded fasteners.

16. The apparatus of claim 1, wherein the outer housing is of metal.

17. The apparatus of claim 1, wherein the outer housing has a pair of electrical terminals, accessible from the exposed side of the outer housing, with means for connection to an external power supply in lieu of said battery in the event the battery has insufficient power to operate the electronic lock.

18. The apparatus of claim 17, further including a pair of recesses on the exposed side of the outer housing, within which said terminals are positioned, such that the terminals are recessed from the exposed side of the outer housing.

19. The apparatus of claim 1, wherein the outer housing is no larger than about 2 inches in width, 3 inches in height and ⅝ inch in depth.

20. The apparatus of claim 19, wherein the inner housing is no larger than about 3 ¼ inches in width, 3 inches in height and ⅞ inch in depth.

21. The apparatus of claim 1, further including spring means constantly urging the latch to the latched position, said solenoid being connected to retract the latch against the spring when activated by the microcontroller means, and said microcontroller means being programmed so that entry of said sequence into the keypad will retract the latch to the unlatched position momentarily, then release the latch, allowing the spring means to return the latch to the latched position.

22. The apparatus of claim 1, wherein the microcontroller means includes means for activating a pulsed audible sound when the battery is low.

23. The apparatus of claim 1, wherein the keypad includes 12 keys, including the numbers 0 through 9 and a further initializing key and an entry key, and the selected sequence including the initializing key as a first key in the sequence and the entry key as a last key in the sequence.

24. The apparatus of claim 21, wherein the microcontroller means includes user programmable means for permitting the user to choose any of a large number of key sequences as said selected sequence by first entering, when the electronic lock is in a reset mode, a desired sequence as said selected sequence.

25. The apparatus of claim 24, further including infrared signal receiver means on the exterior of the outer housing and connected to the microcontroller means, for receiving a signal from a hand-held infrared transmitter device for resetting the electronic lock, and including means associated with the microcontroller means for resetting the lock to said reset mode when said signal is received by the infrared signal receiver means.

26. The apparatus of claim 1, wherein the locker door comprises a contemporary locker door with three-hole lock receiving pattern with three holes in the locker door aligned vertically, including a middle hole comprising said opening through which the plug-in connector means connects the inner and outer housings, and the housings being secured to the door via the other two holes.

* * * * *